March 15, 1966 R. R. HOLBROOK 3,240,072
SPEEDOMETER
Filed Aug. 22, 1962 3 Sheets-Sheet 1
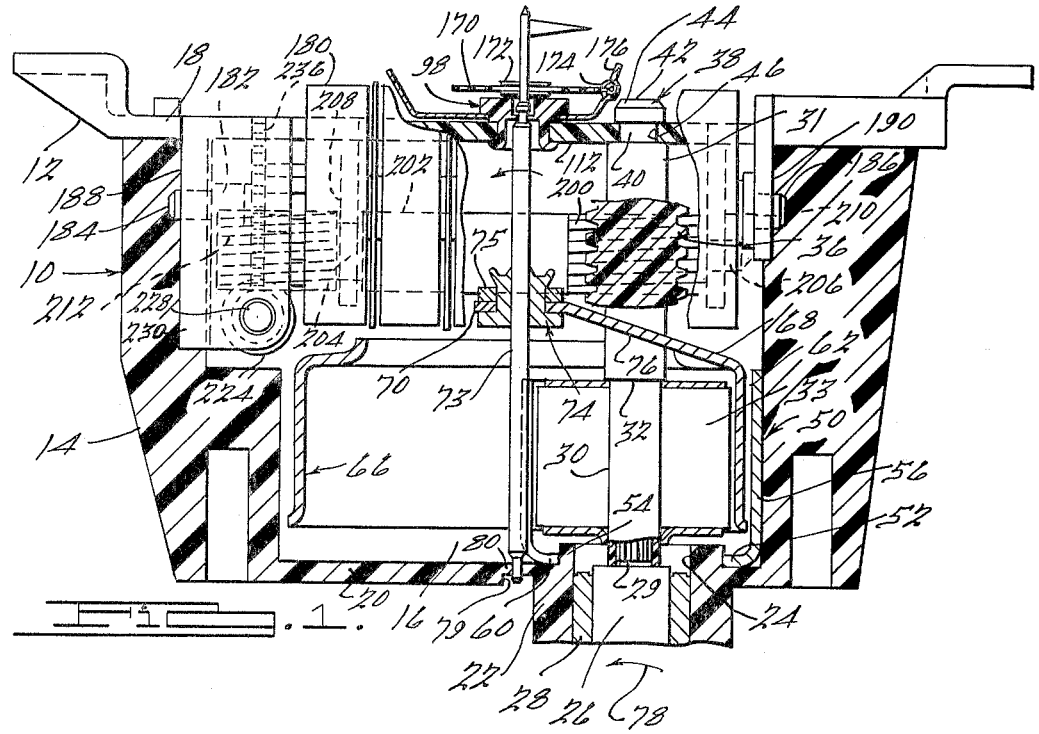
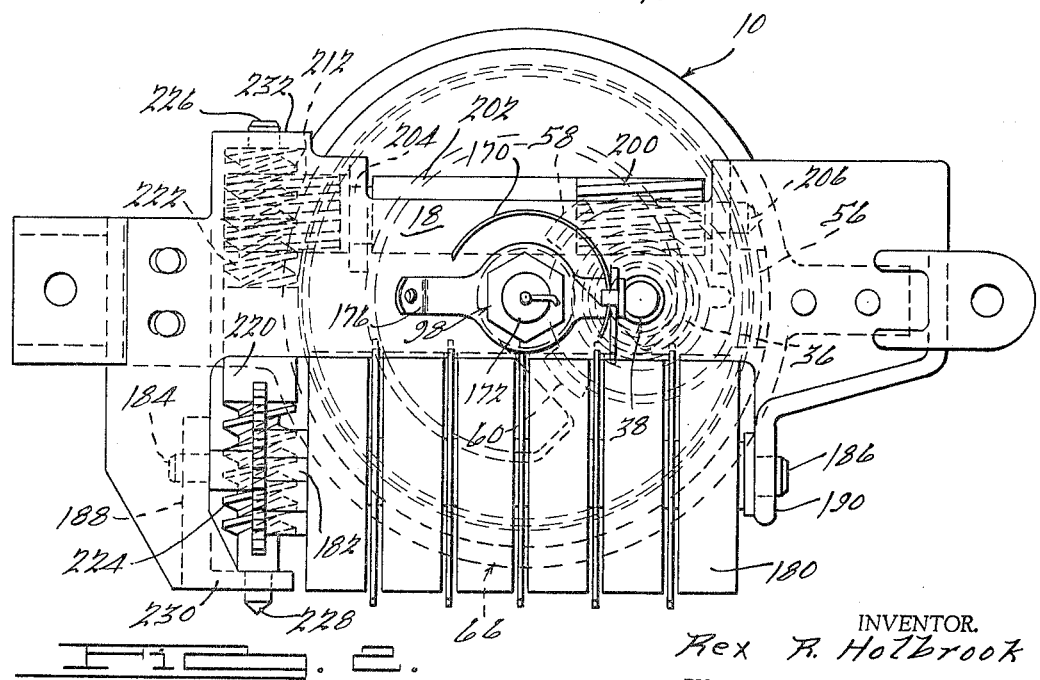
INVENTOR.
Rex R. Holbrook
BY
Harness, Dickey & Pierce
ATTORNEYS March 15, 1966
R. R. HOLBROOK
3,240,072
SPEEDOMETER
Filed Aug. 22, 1962
3 Sheets-Sheet 2
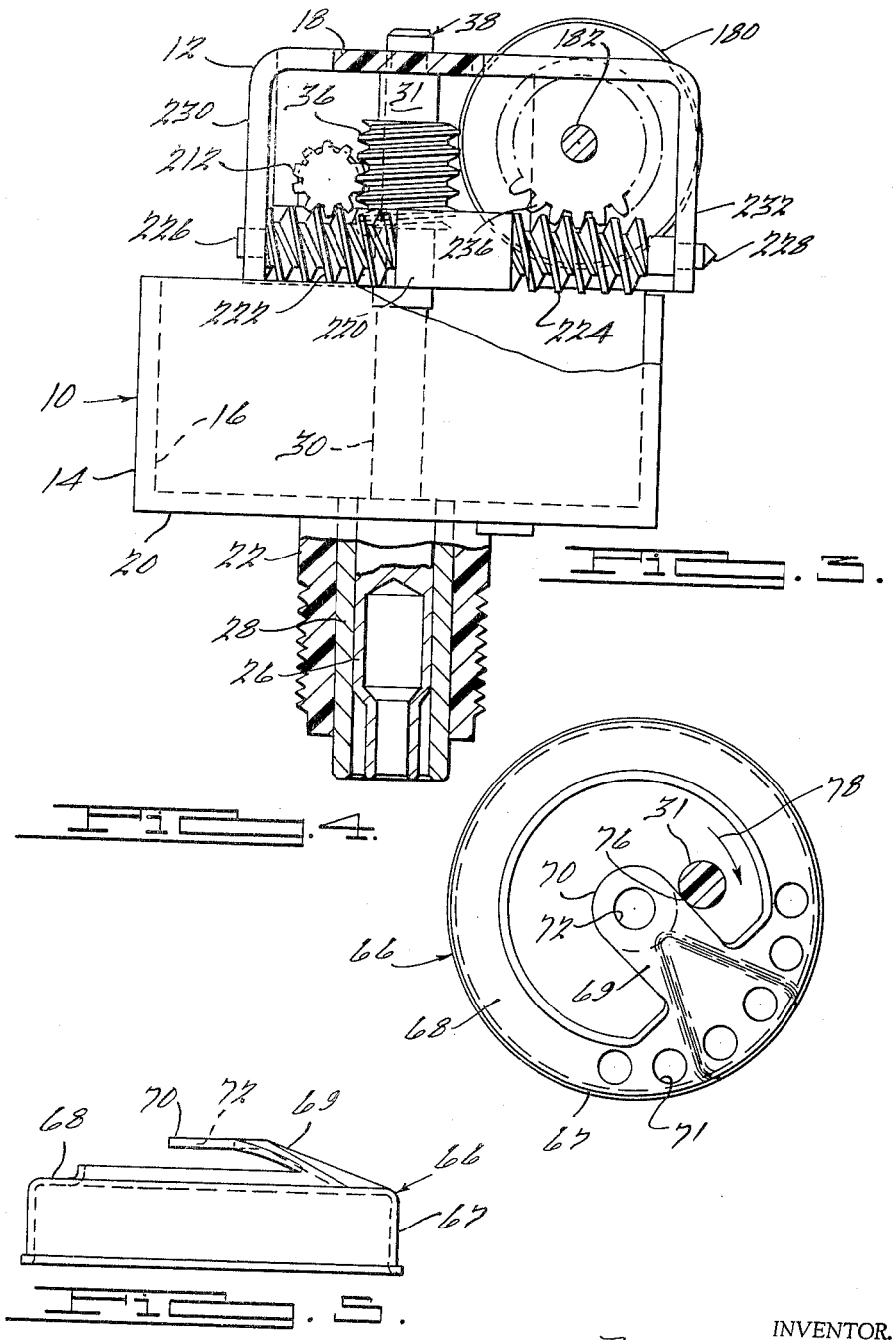
INVENTOR.
Rex R. Holbrook
BY
Harness, Dickey & Pierce
ATTORNEYS

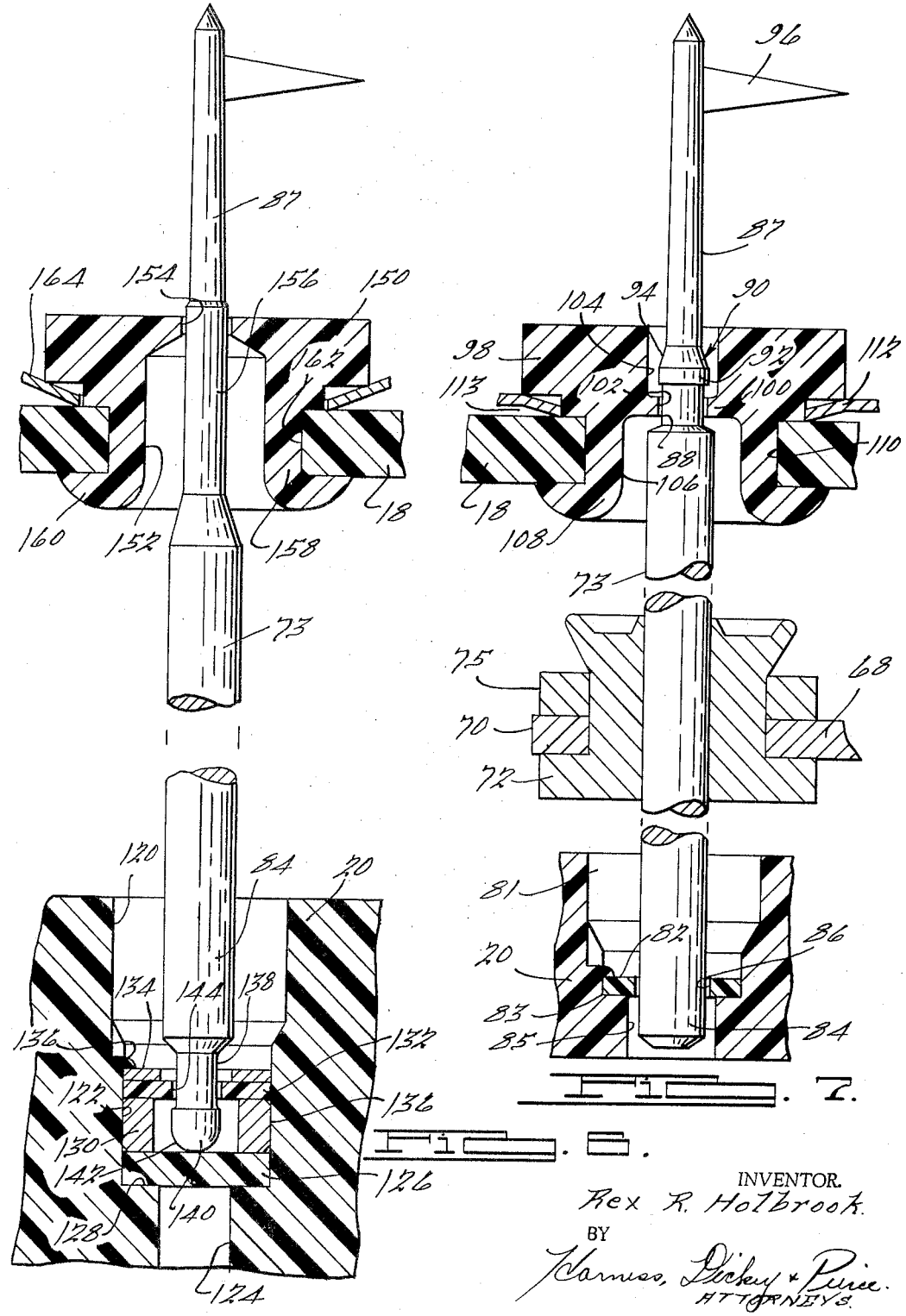

# United States Patent Office 3,240,072
Patented Mar. 15, 1966

3,240,072
SPEEDOMETER
Rex R. Holbrook, Ann Arbor, Mich., assignor to King-Seeley Thermos Co., Ann Arbor, Mich., a corporation of Michigan
Filed Aug. 22, 1962, Ser. No. 218,701
25 Claims. (Cl. 73—496)

This invention relates to a vehicle speedometer or the like.

One of the objects of the present invention is to provide a compact speedometer having an improved drive arrangement. To this end a rotatable driving magnet is mounted eccentrically relative to a magnetically rotatably driven cup which rotatably actuates a speedometer pointer through a pointer shaft. Consequently, the pointer shaft is located at approximately the central axis of the speedometer unit and the entire unit is more compact to provide greater clearance for assembly within a vehicle dashboard. Furthermore, the odometer gear train may be centrally placed in front of the drive cup in a compact arrangement wherein the gearing is optimumly located and connected for best results.

Another object of the present invention is to provide a speedometer unit utilizing new and improved snap-in type bearing means by which the various speedometer shafts may be mounted in a manner facilitating accurate assembly and alignment with a minimum of time and expense and requiring a minimum number of fastening parts for securing the shafts in position. To this end it is proposed to provide a moulded or extruded plastic housing or frame having various integral resilient ears which are resiliently deformable to allow shafts to be snapped into supported position within suitably provided bearing means. The use of snap-in type bearing supports provides distinct advantages over prior art speedometers with regard to minimization of noise in operation, the elimination of variations in shaft end play, and the elimination of the use of auxiliary brackets, clips, pins, wire forms, etc., for securing the shafts in assembled positions.

A further object of the present invention is to provide a new and improved speedometer having a drive arrangement which eliminates the necessity for a stationary pointer shaft bearing construction. To this end the pointer shaft is provided with snap-in type bearing means in which the pointer shaft bearings are part of the speedometer frame or housing and no intermediate stationary bearing associated with the drive mechanism and having critical alignment requirements relative thereto is required.

Another object of the present invention is to provide an improved stop means for positively locating a speedometer mechanism in a zero indicating or rest position. To this end, a drive magnet means, including a magnet drive shaft, is mounted eccentrically relative to a pointer shaft carried by a magnetically driven speed cup. An abutment is integrally formed on the speed cup and located for engagement with the magnet shaft at the zero indicating or rest position.

An additional object is to provide means to overcome the tendency of a speedometer indicating shaft to momentarily lag behind associated drive means during the initiation of shaft movement. To this end, an eccentrically mounted drive shaft is located for abutting engagement with an abutment surface integrally associated with the indicating shaft in the zero indicating or rest position in a manner such that the initial rotation of the drive shaft tends to impart a corresponding rotation to the indicating shaft. Consequently, the inherent resistance to initial rotation, found in conventional speedometers and resulting in indicating error at low speed, is effectively lowered.

Related objects include the provision of multipiece shaft construction permitting integral moulding of shafts and gearing; and the provision of a new and improved flux collector arrangement in connection with the eccentrically mounted magnet.

The principles of the present invention are hereinafter disclosed in detail by reference to an illustrative embodiment of a speedometer shown in the accompanying drawing wherein:

FIGURE 1 is a plan view, partly in section, of the illustrative embodiment;
FIGURE 2 is a side elevational view of the apparatus shown in FIG. 1;
FIGURE 3 is another side elevational view of the apparatus shown in FIG. 1;
FIGURE 4 is a detail plan view of a portion of the apparatus shown in FIG. 1;
FIGURE 5 is a side elevational view of the apparatus shown in FIG. 4;
FIGURE 6 is an enlarged detail view, in section, of an alternative embodiment of the speedometer shaft mounting shown in FIG. 1; and
FIGURE 7 is an enlarged detail view, in section, of an alternative embodiment of the speedometer shaft and mounting shown in FIG. 1.

Referring now to FIGS. 1, 2 and 3, a speedometer embodying the principles of the present invention is illustrated and comprises a frame or housing 10 formed from a conventional plastic material having a degree of resiliency. The housing includes a front bridge member 12 mounted on a body member 14 in any suitable manner. A central cavity 16 is provided in the body portion and a central wall portion 18 of the bridge member extends across the front thereof. The rear of the central cavity is closed by a wall 20 having a hub 22 integrally formed therein. A central bore 24 in the hub rotatably supports a magnet drive shaft 26 in a bearing sleeve 28. The drive shaft may be connected to operating means (not shown) in any conventional manner.

A reduced connecting portion 29 is provided on the end of the drive shaft 26 and is drivingly received in a reduced end 30 of a worm shaft 31. A shoulder 32 is formed by the connection of the reduced end 30 to the worm shaft. Magnet means 33 are mounted on the reduced shaft end. The shaft 31 has a worm 36 integrally formed thereon and has a reduced end portion 38 on which support bearing means for the shaft are formed by the provision of an annular groove 40 and an end cap 42 having a beveled outer surface 44. A bearing hole 46 is provided in the wall 18 and has a diameter substantially equal to the diameter of the shaft portion forming the groove 40. The width of the groove 40 is substantially equal to the width of the wall which is made from a plastic material having sufficient rigidity to support the various parts associated with the shaft 31 in properly spaced locations and having sufficient flexibility to permit the end cap 42 to be forcibly inserted through the bearing hole 46 by a combination of deformation of the end cap and the front wall adjacent the bearing hole. The bearing hole is substantially aligned with the bore 24 in the rear wall 20 of the speedometer housing. However, the alignment is not critical since the dimensions of the shaft and bearing supports may have substantial variation without effecting the accuracy of the device as hereinafter described.

In order to create a magnetic field for a purpose to be hereinafter defined, a flux collector cup 50 is concentrically mounted circumjacent the magnet means 33 and comprises an annular base portion 52 which is secured to an inwardly projecting hub portion 54 on the rear wall 20 of the housing. The flux collector member 50 is divided into separate arcuate flux plates 56, 58, 60 by axially extending gaps of substantial width. As may be seen in FIG. 1, the magnet means and the flux plates are spaced from one another to provide a gap 62.

A speed cup member 66 is mounted in the cavity 16 of the housing with the rim thereof positioned in the gap 62 between the magnet means and the flux plates. As shown in FIGS. 4 and 5, the speed cup comprises a rim portion 67, a radial flange portion 68 and a radially inwardly extending support arm 69 which is integrally connected to the flange portion at one end and terminates in an attachment plate 70 extending substantially at right angles to the central axis of the cup member. A plurality of holes 71 may be formed in the flange 68 to balance the cup member and attaching shaft hole 72 is formed in the plate 70. Referring again to FIG. 1, the cup member is staked on an indicator staff 73 by a coupling member 74 and a washer member 75. The staff 73 is located substantially centrally of the housing 10 on the central axis thereof. Consequently, it may be seen in FIG. 1 that the magnet shaft is eccentrically mounted relative thereto and that the magnet means is also eccentrically mounted.

The radially inwardly extending support arm 69 is adapted to have abutting engagement with the shaft 31 in the zero position or rest position of the speedometer as shown at 76 in FIGS. 1 and 4. The speed cup 66 is magnetically actuated by rotation of the magnet means during movement of the vehicle resulting in varying radial displacement of the speed cup dependent on vehicle speed. The maximum radial displacement is substantially less than 360° and, consequently, the support arm 69 may have a substantial width to provide adequate support for the cup. The abutment surface 76 of the support arm is located in a particular manner during abutting engagement with the shaft 31 and has a particular relationship to the direction of rotation of the drive shaft and the magnet means and the speed cup as indicated by the arrow 78. As shown in FIG. 4, rotation of the shaft 31 at the zero or rest position, in the direction of arrow 78, tends to exert a driving force on the arm 69 at 76 which causes rotation of the arm and the speed cup in the same direction of rotation as that induced by rotation of the magnet means.

The staff or shaft 73 is rotatably supported in a novel manner in the end walls 18, 20 of the housing. As shown in FIG. 1, the rear end of the shaft 73 may be mounted in a counterbore 79 in the rear wall 20 and is rotatably supported on bearing means formed by a radially extending flange 80. In FIG. 7, an alternative bearing means structure is shown to comprise a counterbore 81 having a plastic bearing washer 82 staked on a washer seat 83 in a conventional manner. The washer may be made from a suitable bearing material such as nylon. The end 81 of the shaft extends into a bore 85 through a bearing aperture 86 provided in the washer. The end 84 of the shaft is rotatably supported by a sliding fit within the bore 84 and is not restrained from axial movement. The other end of the staff is provided with a reduced end portion 87 which is separated from the central body portion by an annular groove 88 and a snap-in abutment 90 formed by an enlarged annular portion 92 and a tapered approach surface 94. An indicator pointer 96 may be mounted on the end of the staff and associated with suitable indicia in a conventional manner.

The end of the staff is rotatably supported in a plastic plug 98 having a centrally located bearing means formed by an annulus 100 and a bore 102 having a diameter approximately equal to the diameter of the groove 88 and less than the diameter of the abutment 90 and the central portion of shaft 73. Enlarged bores 104, 106 of suitable diameter are provided on each side of the bearing annulus to accommodate the enlarged portions of the shaft. The bearing plug 98 may be provided with an inwardly extending rim portion 108 which may be staked over the adjoining wall surface to fixedly secure the bearing plug in an aperture 110 in the end wall 18. A spring bracket-washer retainer 112 is secured between the plug and the wall in a groove 113. The staff is adapted to be mounted in the bearing by axial insertion of the abutment 90 through the bore 100 and by flexible deformation of the bearing annulus 100 to permit the abutment 90 to pass therethrough until the bearing surface is located in the groove 88. The groove 88 is substantially wider than the width of the bearing flange 100 to permit substantial axial displacement of the staff 70 without binding interference between the spaced shoulders.

In FIG. 6, a modification of the staff supporting means is shown and comprises a series of counterbores 120, 122, 124 provided in the end wall 20. A bearing arrangement is mounted in the central counterbore 122 and comprises a bearing plate 126 supported on a shoulder 128 between the counterbores 122 and 124. The bearing plate 126 may be held on the shoulder 128 by a ring element 130 and a bearing washer 132 which are fixedly secured by an outer washer 134 staked in place as indicated at 136 in a conventional manner. The rear end 84 of the shaft 73 is provided with a snap-in portion comprising an annular groove 138 and an enlarged end portion 140. The end portion may be rounded as indicated at 142 or provided with a suitable tapered portion to facilitate insertion through a bearing aperture 144 provided in the bearing washer 132. The end 140 is preferably spherical in shape to facilitate bearing engagement with the bearing plate 126. The shoulders defined by the grooves have a substantial axial spacing to permit axial movement of the shaft 80 relative thereto.

The other end 87 of the shaft is adapted to be rotatably received within a bearing plug 150 having a central cavity 152 which terminates in a bearing ring or annulus 154 having an inner diameter substantially equal to the diameter of a reduced portion 156 of the staff. The staff portion 156 is slidably received within the bearing aperture and is axially displaceable therein. The bearing plug 150 is provided with a rearwardly extending rim portion 158 which may be peaned over as indicated at 160 to secure the plug in an aperture 162 provided in the end wall 18. A spring bracket-washer retainer device 164 may be provided to secure the assembly in place.

Referring again to FIG. 1, it may be seen that the staff 73 is provided with a conventional return spring 170 which is fixedly secured to the end of the staff by a retainer 172. The outer end of the spring 174 is fixed to the spring bracket 176, the inner end of which forms part of the spring retainer 112 and is fixedly secured to the bearing bushing 98.

The speedometer further comprises an odometer cluster comprising a series of rotatably mounted cylinders 180 having suitable indicia printed on the periphery thereof. The odometer cylinders are mounted on an odometer shaft 182 which extends transversely to the central axis of the speedometer, as represented by the staff 73, and is located in front of the magnet means 33 and the speed cup 66. The ends 184, 186 of the odometer shaft 182 are mounted in parallel spaced flanges 188, 190 which are integrally formed with the housing portion 12 and extend outwardly therefrom. The odometer shaft is rotatably mounted in aligned apertures provided in the flanges 188, 190 by deflecting the flanges outwardly to enable the ends 184, 186 of the shaft to be inserted into the apertures. The odometers are driven by the shaft 31 through the worm gear 36 which is mounted in driving engagement with a worm 200 integrally molded from plastic material on a shaft 202. A reduced portion 204 and an end 206 of the shaft 202 are rotatably supported in bearing apertures provided in flanges 208, 210 which are integrally formed with and extend outwardly from the front wall 18 of the housing. The flanges 208, 210 are resiliently deformable outwardly away from one another to permit insertion of the ends 204, 206 of the shaft into the bearing apertures as hereinbefore described with reference to shaft 182. A worm 212 is integrally formed on the other end of shaft 202 and is drivingly associated with a worm shaft 220 having integral worm portions 222, 224. The end portions 226, 228 of the worm shaft 220 are adapted to be rotatably received in bearing apertures provided in outwardly extending integrally formed flanges 230, 232. The integral shafts and worms may be molded from a conventional plastic material such as nylon. The worm portion 222 is mounted in driven engagement with the worm portion 212 of the worm shaft 202. The worm portion 224 is mounted in driving engagement with a worm gear 236 fixedly mounted on the odometer shaft 182.

Consequently, as may be seen, all of the shafts are molded integrally with the worm driving portions and are rotatably mounted in plastic bearings formed by bearing apertures provided in resiliently outwardly deflectible flanges which enable the ends of the shafts to be inserted into the bearing apertures for rotative support therein. None of the gear train shafts require special bearings, mounting brackets, clips or the like, and a minimum number of parts having maximum life are thereby utilized.

The operation of the speedometer is conventional in that the shaft 26 is connected to a moving part of the vehicle directly related to the speed thereof. The shaft 26 is rotatably driven and imparts rotative movement to the magnet means 33. The magnet means, in connection with the flux plates 56, 58, 60, create a force causing rotative displacement of the speed cup 66 in the same direction. The speed cup moves from an initial zero position to a maximum position depending on the speed of the vehicle. The rotation of the speed cup is substantially less than 360° so that the speed cup support arm 68 never travels from its initial zero position of engagement with the shaft 34 to a position where it will have subsequent contact therewith. Movement of the speed cup 66 imparts corresponding rotary movement to the staff 73. The staff rotates against the bias of the spring 170 and causes rotative displacement of the pointer indicator corresponding to the speed of the vehicle. When the vehicle is decelerating the spring 170 tends to return the staff, and consequently, the speed cup 66 toward the zero or rest position. When the vehicle ceases to move the spring rotates the staff and the speed cup to the rest position which is positively located by abutting engagement of the speed cup support arm 68 with the shaft 31.

When the vehicle starts from zero velocity position, the initial tendency for the speed cup 66 and the staff 73 to lag is counteracted by the engagement of the arm 68 with the shaft 31. The initial rotation of the shaft 26 in response to movement of the vehicle causes an initial displacement of the speed cup and the staff in the bearing elements at the ends thereof. Thereafter the speed cup and the staff are rotated by the influence of the rotating magnet 33. As is well understood in the art, the speed of rotation of the magnet means determines the corresponding rotative displacement of the speed cup and the rotative displacement of the speed cup is variable throughout a range from the initial position to a maximum position of displacement substantially less than 360°.

At the same time that the speed of the vehicle is being indicated by the indicator pointer, the odometer is being correspondingly actuated through the drive shaft 26, the worm gear 36, the cross worms 200, 212, 222, 224, and the worm gear 236. The odometer gear train is compactly arranged in the front of the speedometer casing in front of the speed cup and comprises a compact series of worm gears extending at right angles to one another.

The inventive principles have been hereinbefore disclosed by reference to a presently preferred embodiment for illustrative purposes, but the invention is obviously not limited to the details of construction or the particular arrangement of the parts and may be otherwise variously embodied and practiced within the intended scope of the appended claims.

The invention claimed is:

1. A speedometer comprising a housing, a staff rotatably mounted in said housing, cup means fixedly secured to said staff and rotatable therewith, drive shaft means connected to a speed responsive device, said drive shaft means being located eccentrically relative to said staff and said cup means, and magnet means mounted on said drive shaft means and being eccentrically mounted relative to said staff and said cup means to cause rotation thereof through an arc less than 360° in response to rotation of said shaft means.

2. The invention as defined in claim 1 and having flux plate means located circumjacent said magnet, said magnet means being spaced from said flux plate means to provide a gap, said cup means having a rim portion located in spaced relation between said magnet means and said flux plate means in said gap, and said flux plate means having means permitting rotative movement of said cup between said magnet means and said flux plate means.

3. The invention as defined in claim 1 and wherein radially inwardly extending arm means are provided to support said cup means on said staff, said arm means being located for abutting engagement with said drive shaft means in the initial zero position of said speedometer.

4. The invention as defined in claim 3 and wherein said drive shaft means is located in abutting engagement with said arm means and adapted to impart initial rotary movement to said cup means and said staff by frictional engagement with said arm means.

5. The invention as defined in claim 1 and wherein said staff is supported by spaced bearing means, one of said bearing means comprising a bearing ring rotatably supporting said staff and permitting axial displacement thereof, an abutment means and groove means provided on said staff, and said other bearing means comprising a bearing ring through which said abutment means is receivable to locate said bearing ring adjacent said groove means to rotatably support said staff and permit axial displacement thereof over the width of said groove means.

6. In a speedometer, a bearing arrangement for rotatably supporting a shaft and permitting limited axial displacement thereof comprising a first bearing means in the form of a bearing ring, a second bearing means in the form of a bearing ring, groove means formed on a portion of said shaft and associated with one of said bearing means to limit axial displacement of said shaft to a range of movement over the width of said groove means, and a shaft portion being freely slidably and rotatably supported by the other of said bearing means.

7. In a speedometer, a bearing arrangement for rotatably supporting a shaft and permitting limited axial displacement thereof comprising, a rotatable shaft member, spaced bearing surfaces provided on said shaft, groove means forming one of said spaced bearing surfaces, first bearing means mounted circumjacent said groove means to rotatably support said shaft and having a width substantially less than the width of said groove means whereby said shaft is axially movable relative to said bearing means over the width of said groove means, a cylindrical surface substantially longer than said groove means forming the other of said bearing surfaces, and a second bearing means mounted circumjacent said cylindrical surface in rotatable support therewith permitting free axial displacement thereof.

8. The invention as defined in claim 7 wherein said second bearing means comprises a cylindrical surface substantially corresponding to said first mentioned cylindrical surface.

9. In a speedometer, a bearing arrangement for rotatably supporting a shaft and permitting limited axial displacement thereof, a housing having spaced side walls formed of resilient plastic material, a first shaft bearing formed in one of said walls by a cylindrical annulus, a second shaft bearing formed in the other of said walls by a cylindrical annulus, a portion of said shaft being formed with groove means, said groove means defining spaced shoulders separated by a cylindrical surface of reduced diameter and having a diameter approximately equal to the diameter of the cylindrical annulus of one of the shaft bearings, said one of the shaft bearings being receivable between said shoulders to limit axial movement of said shaft between predetermined limits determined by the location of said shoulders, and another shaft portion being formed with a straight cylindrical surface substantially equal to the diameter of the cylindrical annulus of the other of the shaft bearings.

10. In a speedometer, a snap-in bearing arrangement for rotatably supporting a shaft comprising a bore, a seat formed in said bore, a bearing washer staked on said seat, and a centrally located bearing aperture formed in said washer and providing a cylindrical bearing surface for said shaft.

11. In a speedometer, a snap-in bearing arrangement for rotatably supporting a shaft comprising a bearing plug, means to secure said bearing plug in a wall, a central bore provided in said plug, a bearing annulus integrally formed in said central bore by a radially inwardly extending flange terminating in an annular cylindrical bearing surface adapted to receive and rotatably support a shaft.

12. In a speedometer, a snap-in bearing arrangement for rotatably supporting a shaft and permitting limited axial movement thereof comprising a rotatable shaft member, a reduced diameter head portion, a rounded outer surface provided on the end of said head portion, groove means formed on said head portion and being spaced axially inwardly from the end of said head portion, spaced shoulder means defined by said groove means and separating a cylindrical surface having a diameter less than the diameter of said head portion at the end thereof, a bearing support comprising a counterbore, a bearing plate mounted in said counterbore for engagement with said rounded outer surface, spacing means mounted in said counterbore, a bearing annulus mounted in said counterbore in spaced relation to said bearing plate, said annulus having an inner diameter smaller than said rounded end and larger than said cylindrical surface, and said annulus being resiliently deformable to permit said rounded end to be inserted therethrough into the space between said bearing plate and said bearing annulus, and said annulus being received in said groove means to limit axial displacement of said shaft to a distance defined by said shoulder means.

13. A speedometer housing comprising a body portion having a central cavity, one end of said cavity being closed by an end wall integral with said body portion, the other end of said cavity being closed by a bridge member secured to said body portion, said bridge member being formed from a resilient deformable plastic material, and a plurality of resilient flanges formed on said bridge member to receive and support the speedometer drive elements.

14. A speedometer comprising a staff rotatably mounted in said housing, cup means fixedly secured to said staff and rotatable therewith, drive shaft means connected to a speed responsive device, said drive shaft means being located eccentrically relative to said staff and said cup, magnet means mounted on said drive shaft means and being eccentrically mounted relative to said staff and said cup means to cause rotation thereof in response to rotation of said shaft means, a speedometer housing comprising a body portion having a central cavity, one end of said cavity being closed by an end wall integral with said body portion, the other end of said cavity being closed by a bridge member secured to said body portion, said bridge member being formed from a resilient deformable plastic material, and a plurality of resilient flanges formed on said bridge member to receive and support the speedometer drive elements.

15. A speedometer comprising a housing, a staff rotatably mounted in said housing, cup means fixedly secured to said staff and rotatable therewith, drive shaft means connected to a speed responsive device, said drive shaft means being located eccentrically relative to said staff and said cup means, magnet means mounted on said drive shaft means and being eccentrically mounted relative to said staff and said cup means to cause rotation thereof in response to rotation of said shaft means, flux plate means located circumjacent said magnet means, said magnet means being spaced from said flux plate means to provide a gap, said cup means having a rim portion located in spaced relation between said magnet means and said flux plate means in said gap, said flux plate means having means permitting rotative movement of said speed cup between said magnet means and said flux plate means, said housing comprising a body portion having a central cavity, one end of said cavity being closed by an end wall integral with said body portion, the other end of said cavity being closed by a bridge member secured to said body portion, said bridge member being formed from a resilient deformable plastic material, and a plurality of resilient flanges formed on said bridge member to receive and support the speedometer drive elements.

16. A speedometer comprising a rotatable speed indicating member, a rotatable driving member indirectly coupled to said rotatable speed indicating member, and means directly coupling said rotatable driving member to said rotatable speed indicating member only during initiation of rotation of said rotatable indicating member.

17. A speedometer comprising a rotatable speed indicating member, a driving member rotatably driven at a speed proportional to the speed of a device the speed of which is to be indicated, magnetic means indirectly coupling said rotatable speed indicating member and said driving member whereby said rotatable speed indicating member is variably rotatably displaced within an arc less than 360° in proportion to the speed being indicated and friction type drive means directly coupling said rotatable speed indicating member and said driving member during only an initial stage of rotation of said speed indicating member.

18. A speedometer comprising, a speed indicating shaft rotatable in response to the speed of a device the speed of which is to be indicated, a cup member connected to said shaft and being rotatable therewith, magnetic drive means associated with said cup member to cause rotary displacement of said shaft in response to the speed of the device, and additional drive means associated with said cup member to cause rotation of said shaft, said additional drive means being effective only at preselected rotational conditions between said cup member and said magnetic drive means.

19. A speedometer having a snap-in bearing arrangement for rotatably supporting a shaft and permitting limited axial movement thereof comprising: a rotatable shaft member having a reduced diameter head portion, a rounded outer surface provided on the end of said head portion, groove means formed on said head portion and being spaced axially inwardly from the end of said head portion, spaced shoulder means defined by said groove means and separating a cylindrical surface having a diameter less than the diameter of said head portion at the end thereof, bearing plate means having an opening with a diameter smaller than the rounded end and larger than the cylindrical surface of said head portion, said bearing plate means being resiliently deformable about said opening to permit said rounded end to be inserted therethrough, and portions of said bearing plate means about said opening being received in said groove means to limit axial displacement of said shaft to a distance defined by said shoulders.

20. A speedometer comprising a rotatable input shaft, a rotatable indicating shaft, said input shaft and said indicating shaft having spaced axes of rotation, and magnetic means indirectly coupling said rotatable input shaft to said rotatable indicating shaft and being operable to rotatably displace said indicating shaft through an arc less than 360°, the amount of rotary displacement of the indicating shaft being dependent upon the speed of rotation of said input shaft.

21. A speedometer comprising a housing formed of plastic material having good bearing properties and having a plurality of resilient integral spaced flanges and walls, shaft means rotatably mounted in said housing with end portions resiliently inserted within and directly rotatably supported by surface to surface engagement with certain ones of said integral flanges and walls, and all of said end portions being rotatably secured between spaced ones of said integral flanges and walls.

22. A speedometer comprising rotatably mounted shaft means, cup means mounted on said shaft means, rotatable drive means associated with said cup means to cause rotative displacement of said cup means and said staff through an arc less than 360°, and arm means extended radially from said cup means and located for abutting engagement with said drive means in the initial zero position of the speedometer and adapted to impart initial rotary movement to said cup means and said shaft means by frictional engagement with said drive means.

23. A speedometer comprising a housing, shaft means rotatably mounted in said housing, cup means mounted on said shaft means to impart rotary movement thereto, radially extending arm means drivingly conected to said cup means, and drive means connected to said cup means to impart rotary motion thereto, said drive means also being connected to said arm means to impart initial rotary movement to said cup means.

24. A speedometer comprising a speed indicating shaft, speed responsive means responsive to a speed condition, first drive means connecting said speed indicating shaft and said speed responsive means to cause rotatable displacement of said speed indicating shaft in accordance with the speed condition, and second drive means connecting said speed indicating shaft and said speed responsive means only at preselected speed condition to supplement the effect of said first drive means.

25. A speedometer comprising a housing, shaft means rotatably mounted in said housing, magnetic cup means concentrically fixedly secured on said shaft means and being rotatable therewith, rotatable drive shaft means located eccentrically relative to said shaft means and said cup means, magnet means mounted on said drive shaft means and being eccentrically mounted relative to said shaft means and said cup means in closely spaced relationship to said cup means, flux plate means mounted circumjacent said magnet means and in spaced relationship thereto to define a flux gap, and a portion of said cup means being located in said gap between said magnet means and said flux plate means so as to be rotatable through an arc less than 360° to an extent dependent upon the speed of rotation of said magnet means.

References Cited by the Examiner

UNITED STATES PATENTS

| 2,649,559 | 8/1953 | Wargo | 310—105 X |
| 2,722,617 | 11/1955 | Cluwen | 310—103 |
| 2,884,283 | 4/1959 | Korol et al. | 308—15 |
| 3,033,624 | 5/1962 | Biesecker | 308—238 |
| 3,049,636 | 8/1962 | Stadelmann | 310—97 |
| 3,073,978 | 1/1963 | Hegelby | 310—97 |
| 3,107,947 | 10/1963 | Hulterstrum | 308—18 X |

FOREIGN PATENTS 652,923  10/1928  France.

ORIS L. RADER, *Primary Examiner.*

DAVID X. SLINEY, *Examiner.*